Figure 1:
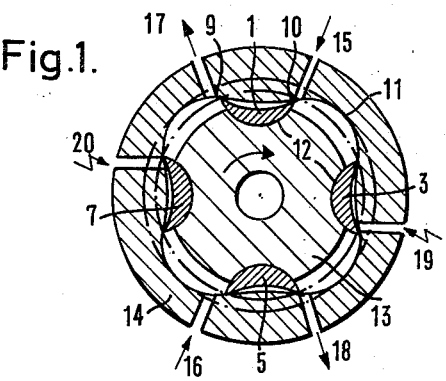
Figure 2:
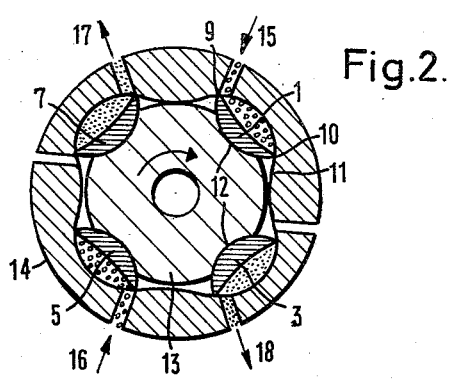
Figure 3:
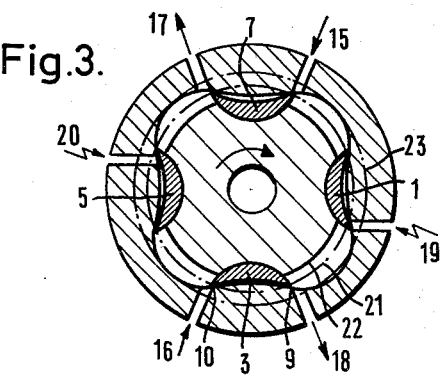
Figure 4:
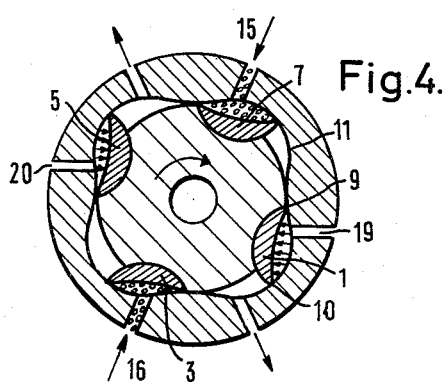

Oct. 29, 1963     O. KORF     3,108,579
ROTARY PISTON INTERNAL COMBUSTION ENGINE
Filed April 24, 1961     2 Sheets-Sheet 1

INVENTOR:
OTTO KORF
By Jacob L. Kollin
ATTORNEY

Oct. 29, 1963     O. KORF     3,108,579
ROTARY PISTON INTERNAL COMBUSTION ENGINE
Filed April 24, 1961     2 Sheets-Sheet 2

INVENTOR:
OTTO KORF

By Jacob L. Hollin
ATTORNEY

United States Patent Office 3,108,579
Patented Oct. 29, 1963

3,108,579
ROTARY PISTON INTERNAL COMBUSTION ENGINE
Otto Korf, Im Weinel 34, Frankfurt am Main, Germany
Filed Apr. 24, 1961, Ser. No. 105,151
Claims priority, application Germany May 2, 1960
2 Claims. (Cl. 123—17)

The invention relates to a rotary piston internal combustion engine with a rotor which rotates in a water-cooled housing closed by plane end walls at the front and back and between the sides of which and the inner surface of the housing, chambers of different sizes are formed during the rotary movement, in which chambers the working strokes of induction, compression, ignition and expansion with exhaust take place successively.

In contrast to a known type of construction in which the rotor rotates eccentrically and produces inertia forces which have to be balanced by counterweights in order to compensate for the out-of-balance which occurs, such phenomena do not appear in the rotary piston engine according to the invention.

According to the invention, a cylindrical rotor is provided which is journalled in its cylinder axis and which, at its circumference, serves as a bearing for pendulum blocks which are sickle-shaped in cross-section and bear tightly, with their two edges, against the inner face of the housing, said face having an outline in which sinusoidal curves alternate continuously with cosine-like curves relatively to a mean circle between the superficial circle of the cylindrical rotor and the enveloping circle round the maximum widening in the housing. The elevation and depression of the waves in these curved paths determine, depending on the required engine power, the volumes for the individual operations inside the rotary piston engine and are determined by the mutual distance of the two edges of each pendulum block in relation to the bearing surface on the cylindrical rotor. Each pendulum block lies with both its edges close against the inner wall of the housing at every moment during the rotary movement.

For correct operation of the rotary piston internal combustion engine according to the invention, at least eight successive pendulum blocks of sickle-shaped cross-section are provided, which are preferably mounted in trough-like recesses in the cylindrical rotor, the shape of the recesses matching the back of the pendulum blocks, while, in the housing, four diametrically opposite sinusoidal curved paths lie between cosine-shaped curved paths which likewise lie diametrically opposite one another, the sine-shaped curves on the one hand and the cosine-shaped curves on the other hand, being congruent.

The principle of the invention may also be used for rotary compressors. For this purpose, as distinct from the arrangement in the rotary piston engine, admission apertures for the medium to be drawn in and outlets for the compressed medium are distributed alternately over the circumference of the housing. The ignition devices are omitted. As a result of the application of the working principle according to the invention to rotary compressors, the admission and compression cycle is carried out by each pendulum block on its way over the region of a set of curves consisting of a concave curved and a following convex curved contour of the inner surface of the housing, so that with one revolution of the rotor, which now no longer delivers power but has to be set in rotation by an external force, the admission and compression are effected repeatedly, as often as the stretches composed of a convex and a concave set of curves for a working cycle can be accommodated over the whole circumference of the inner surface of the housing.

The preferred embodiment of a rotary compressor according to the invention consists in that symmetrically distributed over the circumference of the cylindrical rotor are four pendulum blocks between the curved surfaces of which and the inner surface of the housing, large admission chambers and small compression chambers are formed alternately during rotation, while the gaps in the spaced pendulum blocks, between the outer surface of the cylindrical rotor and the inner surface of the housing from large admission chambers and small compression chambers in inverted rhythm.

Whereas in the rotary piston internal combustion engine it is only possible to utilize the whole area between the inner surface of the housing and the rotor for correct working efficiency if the rotor is equipped with pendulum blocks over its whole circumference so that these lie with their transverse edges directly adjacent, in the rotary compressor according to the invention, it is possible to manage with half the pendulum blocks because the gaps which lie between the spaced pendulum blocks also form large and small chambers alternately in which the compression and admission respectively take place, in conjunction with the inner surface of the housing. The possibly unequal volumetric proportions in the two types of admission chamber on the one hand and two types of compression chamber on the other hand, and the resulting different pressure ratios can easily be handled. For example, this may be effected by providing two separate pressure vessels, while the compressed medium from the region between the pendulum blocks and the inner surface of the housing on the one hand and the compressed medium between the free surface of the rotor and the inner surface of the housing on the other hand each pass into one of these pressure vessels. It is also possible, however, to work with a single pressure vessel and to effect the pressure equalization therein. Naturally, the rotary compressor according to the invention may, like the rotary piston internal combustion engine according to the invention, be equipped with pendulum blocks over the whole circumference of the rotor so that the transverse edges of the individual pendulum blocks touch one another or lie immediately adjacent to one another.

In the drawings, two examples of the application of the principle of the invention to a rotary piston internal combustion engine and one example of its application to a rotary compressor are illustrated diagrammatically, the modes of operation and details being explained with reference thereto.

Figure 5:
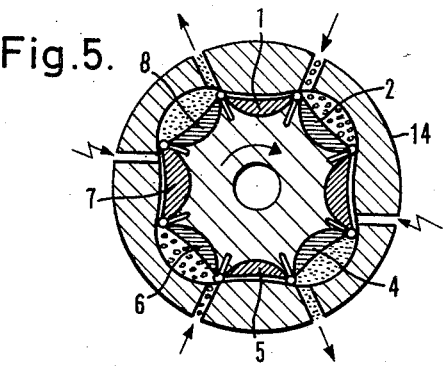
Figure 6:
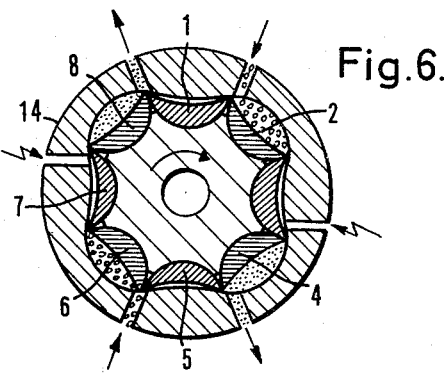

FIGURES 1 to 6 show the rotary piston internal combustion engine,

FIGURES 1, 2, 3 and 4 showing the various positions of the pendulum blocks in various phases of the working cycle, only every other pendulum block being drawn as an aid to understanding, and FIGURES 5 and 6 showing diagrammatically, two types of construction of the rotary piston engine according to the invention.

Figure 7:
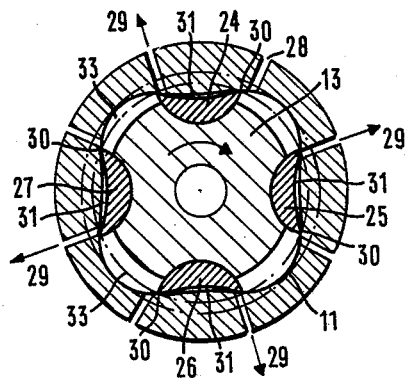
Figure 8:
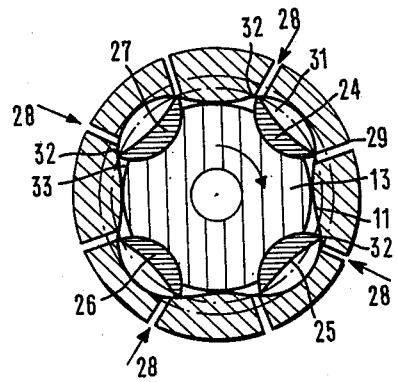
Figure 9:
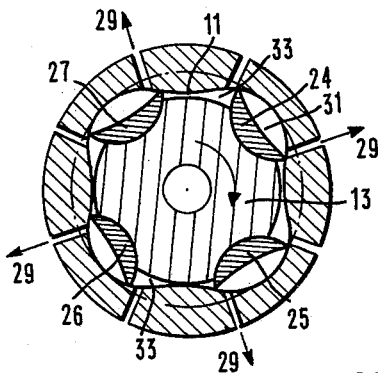

FIGURES 7, 8 and 9 represent the example of the construction of a rotary compressor with the pendulum blocks in different positions in different phases of the working cycle.

In the rotary piston engine construction shown in FIGURES 1 to 6, the individual pendulum blocks 1 to 8 are sickle-shaped in cross section and lie with their two edges 9 and 10 close against the inner wall 11 of the housing all the time. For this purpose, they are mounted with their backs in appropriately hollowed-out bearing position 12 in the cylindrical rotor 13 which rotates about its axis and which, at the same time, forms the output shaft of the engine.

The housing 14 is cooled in a suitable manner—not illustrated in detail—for example by means of water. The induction ports are designated by 15 and 16, the exhaust ports by 17 and 18 and the ignition points, at which there is an ordinary sparking plug, by 19 and 20. The two induction ports 15 and 16 receive their mixture from a carburetor which is preferably mounted in a common conduit, the exhaust ports 17 and 18 may conveniently lead to a common exhaust pipe. The outline of the inner wall 11 is obtained depending on the required working volume of the rotary piston engine and can be graphically determined from the position of the edges 9 and 10 of the pendulum blocks depending on their pendulum and rolling movements in the cylindrical rotor, the result being an alternating substantially sine-shaped and cosine-shaped course about an imaginary mean circle 21 which lies between the boundary circle 22 of the cylindrical rotor 13 on the one hand and the enveloping circle 23 round the maximum widening in the inner surface 11 of the housing on the other hand.

The rotary piston engine according to the invention works as follows:

From the assumed initial position in FIGURE 1, on rotation of the cylindrical rotor in the direction of rotation indicated by the arrow, the pendulum block 1 arrives with its edge 10 over the induction port 15, the induction begins. At the same time, the volume between the pendulum block 1 and the inner wall 11 of the housing increases and a comparatively large chamber is formed with a correspondingly large induction volume. The pendulum block 1 then comes into the position shown in FIGURE 2 and on further rotation, its edge 9 passes over the right-hand edge of the induction port 15. The induction is thus terminated. On further rotation, the compression begins because now the area between the pendulum block 1 and the inner wall 11 of the housing is reduced to the compression volume. At the moment of maximum compression, illustrated in FIGURE 3, the ignition takes place at 19. As a result of the expansion which now follows, the pendulum is driven on in the direction of the arrow into the now increasing gap between the pendulum block 1 and the inner wall 11 of the housing, until the edge 10 travels from the position shown in FIGURE 4 over the right-hand edge of the exhaust port 18. The exhaust now begins and is ended as soon as the edge 9 of the pendulum block 1 has passed the left-hand edge of the exhaust port 18 and reached the position shown in FIGURE 1, except that the pendulum block 1 is now assumed to be displaced through 180°. As the movement continues, the edge 10 travels over the inlet port 16 and a fresh mixture of combustion gas enters; the working cycle is repeated. In this manner, each pendulum block performs two working cycles for one revolution of the cylindrical rotor. Each two diametrically opposite pendulum blocks are in the same working position. This can be seen without further explanation from FIGURES 5 and 6.

The difference between the two types of construction consists essentially in that, in the embodiment shown in FIGURE 5, sealing plates which are mounted for movement in radial slots and may be subject to the action of an auxiliary force, for example a spring, are inserted between neighbouring pendulum blocks, their rounded heads bearing against the inner wall 11 and the edges of the pendulum blocks bearing against them and rolling on them.

In the embodiment shown in FIGURE 6 there are no such radially movable plates, the edges 9 and 10 of the pendulum blocks bear directly against one another and against the inner wall 11 of the housing 14.

In the rotary compressor shown in FIGURES 7 to 9, four pendulum blocks 24, 25, 26 and 27 are arranged symmetrically over the circumference of the cylindrical rotor 13 which is set in rotation in the direction of the arrow from the outside, a perfectly balanced working cycle being assured. The gaps between neighbouring pendulum blocks, between the free surface of the rotor 13 and the inner wall 11 of the housing which is provided alternatively with concave and convex curves, also form working chambers, large suction chambers alternating with small compression chambers. The suction ports or passages for the admission of the media to be compressed are designated by 28 and inwardly directed arrows, and the outlet ports or passages for the compressed media are designated by 29 and outwardly directed arrows. They are arranged in such a manner that each working chamber comprises two connections out of the housing, which serve either for drawing in or expelling the compressed medium. These alternating admission and outlet ports are each arranged at a distance from one another which is substantially equal to that between the transverse edges of each pendulum block. This arrangement of the ports which are intended for the expulsion of the compressed medium, so to speak at the rear end of the compression chamber in question, necessitates suitable devices such as slide valves which ensure that the opening of these outlets is effected just before the leading edge 30 of each individual pendulum block travels over the next admission port 28. The control of these movements, for example of the slide valve, which consists of brief opening and closing, is effected by means of known means from the rotor drive, for example through camplates and camshafts, not illustrated.

The rotary compressor according to the invention works as follows:

In the position shown in FIGURE 7, the outlet ports 29 are opened shortly before the passage of the leading edges 30 of the pendulum blocks 24, 25, 26 and 27, so that the compressed medium present in the compression chambers 31 emerges and passes into a storage tank, not illustrated, from which it is conveyed for use. As soon as the edges 30 travel over the left-hand edges of the admission ports 28, the admission begins. The pendulum blocks 24, 25, 26 and 27 pass, with the rotor 13 rotating in the direction of the arrow, into the position shown in FIGURE 8.

As soon as the trailing edges 32 of the individual pendulum blocks have travelled over the right-hand edges of the admission ports 28 and have come into the position shown in FIGURE 9 for example, the compression begins, and is terminated when the individual pendulum blocks have reached a position which is turned through 90 degrees in comparison with that shown in FIGURE 7. At this moment, the outlet ports 29 are briefly opened, the compressed gas flows out and passes through a common conduit, for example into a storage tank, which is not illustrated. Thus the outlet ports 29 are opened four times and four working cycles for the production of pressure gas are achieved for one revolution of each pendulum block.

In the example illustrated in the drawing, the gaps 33 present between neighbouring pendulum blocks 24, 25 or 25, 26 or 26, 27 or 27, 24 are not occupied by pendulum blocks and this is possible according to the invention. Four pendulum blocks are sufficient because the gaps 33 between them, as can be seen from the drawing, likewise form alternating large admission chambers and small compression chambers. Only the rhythm of the working cycle consisting of admission and compression is reversed. While the pendulum blocks 24, 25, 26 and 27 are in the compression position and the compressed gas is emerging from the outlet ports 29, the admission in the preceding and following chambers 33 is substantially completed and the compression is beginning. The compression is concluded substantially in the position shown in FIGURE 8 and the compressed medium emerges through the briefly opened outlet ports 29.

Immediately afterwards, the leading edges 30 of the pendulum blocks travel over these outlet ports 29 which are now closed again so that the compression of the volumes drawn into the chambers 31 can take place.

I claim:

1. A rotary piston internal combustion engine, comprising a hollow housing having an outer cylindrical wall face and an inner wall face formed with at least four recessed concave portions alternating with at least four convex portions, merging with one another; a rotary arranged for axial rotation in said housing, said rotor having an outer face spaced from said inner wall face and being formed with at least eight trough-like axially extending recesses; at least eight adjacent pendulum blocks of sickle-shaped cross-section, received in said recesses, each of said pendulum blocks having edge portions in sliding engagement with said inner wall face, each of said blocks forming consecutively, about the inner periphery of the housing in a predetermined path of the rotor's rotation, an intake chamber with one of said concave recessed portions, a compression chamber with a following convex portion, an exhaust chamber with the ensuing convex portion and an inertia chamber following said exhaust chamber; said chambers having forward and rear portions relative to said predetermined path; said housing wall having an inlet port for each intake chamber adjacent said forward portion, and an exhaust port for said exhaust chamber adjacent said rear portions; and ignition means for said compression chambers adjacent their rear portions.

2. A rotary piston internal combustion chamber according to claim 1, wherein said rotor is further provided with longitudinally extending radial slots and sealing plates received in said slots and extending between said blocks.

References Cited in the file of this patent

UNITED STATES PATENTS

| | | |
|---|---|---|
| 963,436 | Harris | July 5, 1910 |
| 1,326,313 | Ward | Dec. 30, 1919 |
| 2,367,068 | Stevenson | Jan. 9, 1945 |
| 2,621,604 | Martin | Dec. 16, 1952 |